US011376551B2

(12) United States Patent
Lim

(10) Patent No.: US 11,376,551 B2
(45) Date of Patent: Jul. 5, 2022

(54) RO ATMOSPHERIC STORAGE TANK WITHOUT NEED OF PRESSURE TANK OR ELECTRIC PUMP

(71) Applicant: Tsia Yong Lim, Singapore (SG)

(72) Inventor: Tsia Yong Lim, Singapore (SG)

( * ) Notice: Subject to any disclaimer, the term of this patent is extended or adjusted under 35 U.S.C. 154(b) by 0 days.

(21) Appl. No.: 16/962,555

(22) PCT Filed: Jan. 22, 2018

(86) PCT No.: PCT/SG2018/000001
§ 371 (c)(1),
(2) Date: Jul. 16, 2020

(87) PCT Pub. No.: WO2019/143290
PCT Pub. Date: Jul. 25, 2019

(65) Prior Publication Data
US 2020/0406192 A1 Dec. 31, 2020

(51) Int. Cl.
*B01D 61/10* (2006.01)
*B01D 61/02* (2006.01)
*B01D 61/12* (2006.01)
*C02F 1/44* (2006.01)

(52) U.S. Cl.
CPC ........... *B01D 61/10* (2013.01); *B01D 61/025* (2013.01); *B01D 61/12* (2013.01); *C02F 1/441* (2013.01); *B01D 2313/18* (2013.01); *B01D 2313/243* (2013.01); *B01D 2313/50* (2013.01); *C02F 2201/005* (2013.01)

(58) Field of Classification Search
CPC ...... B01D 61/10; B01D 61/025; B01D 61/12; B01D 2313/18; B01D 2313/243; B01D 2313/50; C02F 1/441; C02F 2201/005
USPC ........................................................ 210/125
See application file for complete search history.

(56) References Cited

U.S. PATENT DOCUMENTS 3,390,773 A * 7/1968 Merten .................. B01D 61/12
210/125
2005/0000984 A1 1/2005 Tan et al.

FOREIGN PATENT DOCUMENTS

| CN | 2621014 Y | 6/2004 |
| CN | 200995975 Y | 12/2007 |
| CN | 101143300 A | 3/2008 |
| KR | 20-2012-0006897 U | 10/2012 |
| WO | 2015-012548 A1 | 1/2015 |

* cited by examiner

*Primary Examiner* — Terry K Cecil
(74) *Attorney, Agent, or Firm* — Bay State IP, LLC

(57) ABSTRACT

An Atmospheric Storage Tank (AST) system designed to be an alternative to the existing RO pressure storage tank that operates on water pipeline pressure. It eliminates the disadvantage of subjecting the RO system to back pressure on the feed water which reduces the efficiency of the system and also has a higher probability of leakage. When the AST system is installed below the faucet, a pumping gadget is required to pump the water. It is primarily designed, although not exclusively, to be used together with a zero waste reverse osmosis system.

9 Claims, 6 Drawing Sheets

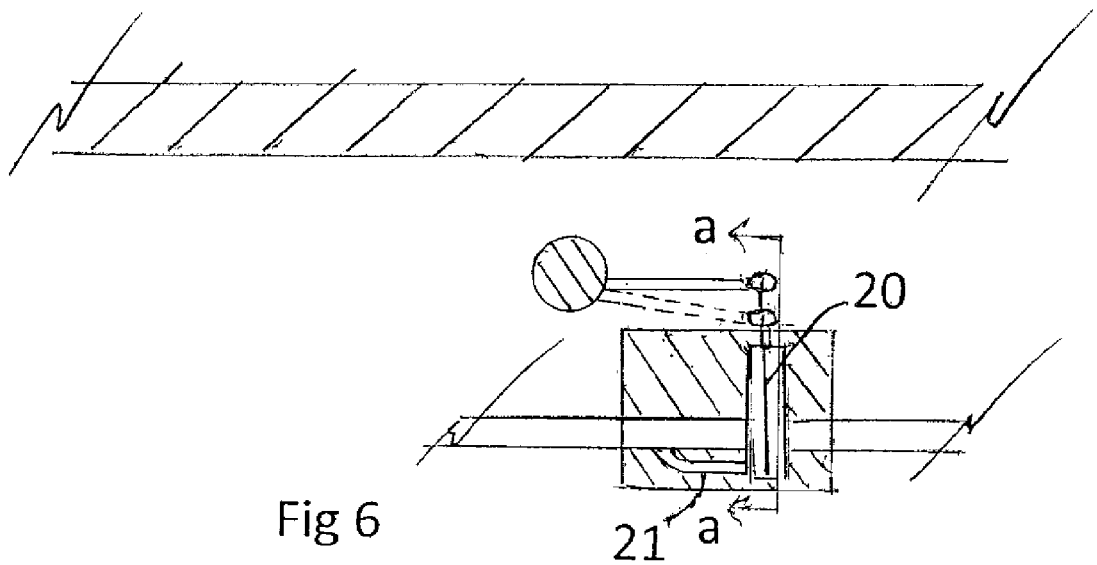
Fig 6
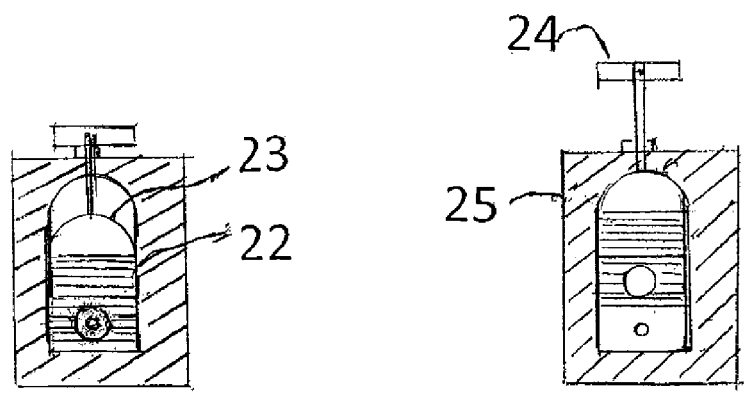
Fig 7
Fig 8

RO ATMOSPHERIC STORAGE TANK WITHOUT NEED OF PRESSURE TANK OR ELECTRIC PUMP

CROSS REFERENCE TO RELATED APPLICATION

This application is for entry into the U.S. National Phase under § 371 for International Application No. PCT/SG2018/000001 having an international filing date of Jan. 22, 2018, and from which priority is claimed under all applicable sections of Title 35 of the United States Code including, but not limited to, Sections 120, 363, and 365(c).

TECHNICAL FIELD

An Atmospheric Storage Tank (hereinafter referred to as "AST") System that does not require a pressure tank to activate the water supply to the Reverse Osmosis Water filter system (hereinafter referred to as "RO") and to pump the water with pressure; and it also does not require an electric pump to pump the water for collection; it is designed for use in RO filter systems and is in line with the established laws and principles in the field of physics.

BACKGROUND

1) The conventional RO systems usually utilize a pressure water tank, made of steel usually, to store the filtered water from the system. The pressure storage tank utilizes pressure in the tank when it is filled with water, to pump the water to faucet outlet for usage when the faucet is turned on. The pressure in the pressure tank fluctuates substantially between empty and full tank. The efficiency of the RO system will be reduced when it is approaching full, i.e. least efficient when it is full as the incoming filtered water is subjected to the higher back pressure from the pressure tank. It also has a bladder in the tank which takes up space and reduces the storing capacity of the tank. The pressure tank effectively is able to store from 50% to 75% of the tank size.

2) It also relies on electrical device to turn on the water supply to the RO when the water pressure and water level in the tank is low.

3) The AST for which patent rights are herewith sought for does not rely on pressure to function, it is subjected to only constant atmospheric pressure, nor does it require an electric pump or electricity to function. It also does not require an electrical device to activate and cut off the water supply to the RO system.

4) The AST is designed for use together with the "Zero Waste" RO filter under patent application PCT/SG2015/000124 (hereinafter named "WT" to represent "Wastewater Tank") under the same applicant hereof, although not exclusively.

BRIEF DESCRIPTION OF THE DRAWINGS

FIG. 6 is a schematic diagram showing the gate valve 20 and the pivoting arm.

FIG. 7 is a schematic diagram showing the gate valve in an open position.

FIG. 8 is a schematic diagram showing the gate valve in a closed position.

DETAILED DESCRIPTION

Figure 1:
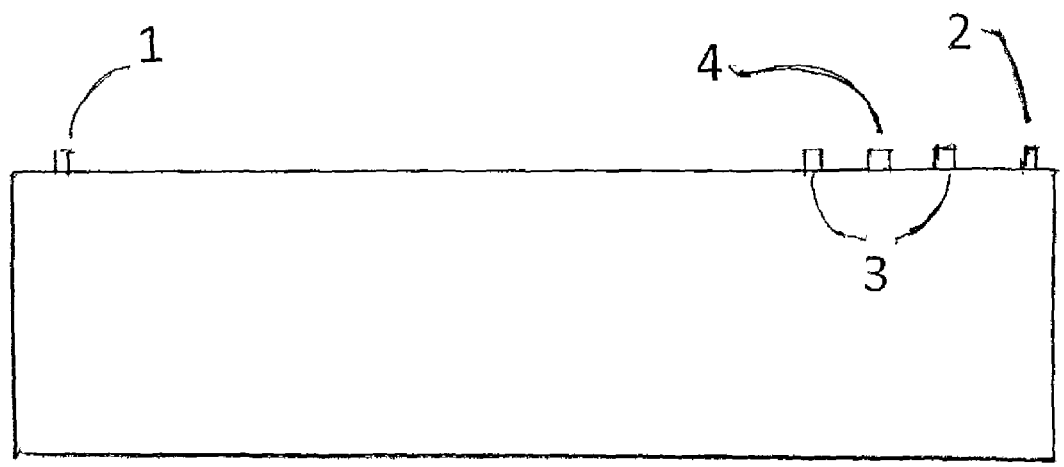
FIG. 1 is a schematic diagram showing the atmospheric storage tank (with cover on).

1) The Atmospheric Storage Tank System comprises a normal rectangular water storage tank made of conventional material used in the industry. It is used for storing the filtered water from the RO systems but without the bladder bag. (FIG. 1) is the plan view of the AST with cover on; dimensions are flexible depending on requirement. It has an input 1 from the RO and an overflow outlet 2 for discharge to the drainage in case of malfunctioning of the control. It has a connection provision to the valve box 4 and two connection provisions for securing the valve box 3 to the AST. The storage tank has a tank inlet in communication with an outlet from the RO filter and a tank outlet in communication with an outlet of the RO faucet.

Figure 2:
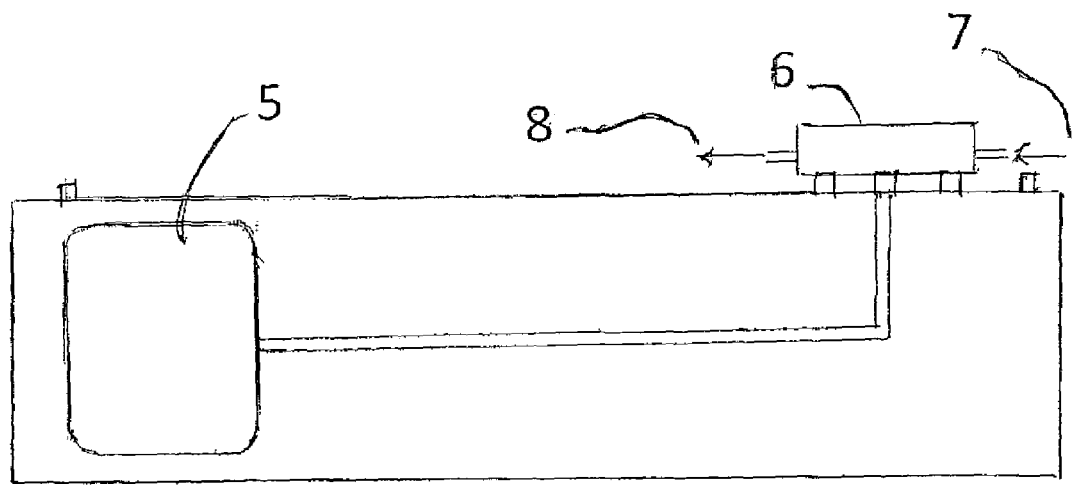
FIG. 2 is a schematic diagram of the atmospheric storage tank without cover showing provision for fixing of valve box and connection between the valve box and the float in the tank.

2) (FIG. 2) is the plan view of the AST without the cover and showing the connection to it. It has a float 5, a valve box 6 and a pumping gadget 13. The pumping gadget is not shown in (FIG. 2). It depends on the level at which it is installed; the AST will not have a pumping gadget when it is installed above the RO faucet outlet level. The pumping gadget will be covered later. The valve box has an inlet of water supply from the pipeline and outlet to the RO unit 7, 8.

When the AST is installed above the faucet level, the AST with the pipeline supply connected, together with the float valve, will be able to provide a system where filtered water is stored in the AST with the float valve opening and closing automatically and the filtered water collected from the faucet when the faucet is opened. When the AST is installed above faucet level, the flow from the faucet will be on gravitational force as the AST is subjected only to atmospheric pressure. The AST will also not have any connection for discharge of water into the drainage or the (WT}.

When the AST system is installed below the level of the RO faucet outlet (sink faucet), it further comprises a pumping gadget and a special faucet (RO filtered water faucet), and it will have connection to the drainage or WT from the outlet of the driving wheel as explained later. The RO filtered water faucet includes the inlet water pipeline and an outlet water pipeline to drive the pumping gadget to deliver the filtered water to the RO faucet for collection. Below are the details.

3) The float valve consists of a float and a valve box. The purpose of the float valve is to provide an alternative to the function of the pressure tank and the electrical device.

Figure 3:
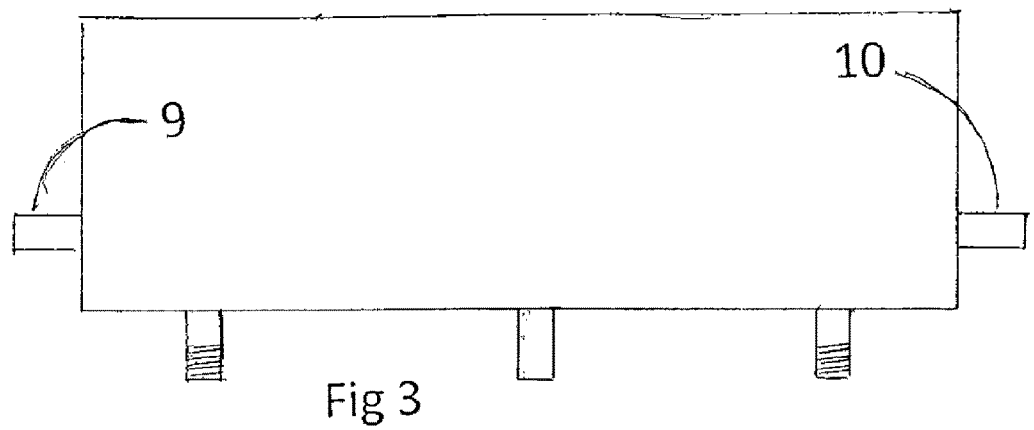
FIG. 3 is a schematic diagram showing the valve box with cover.
Figure 4:
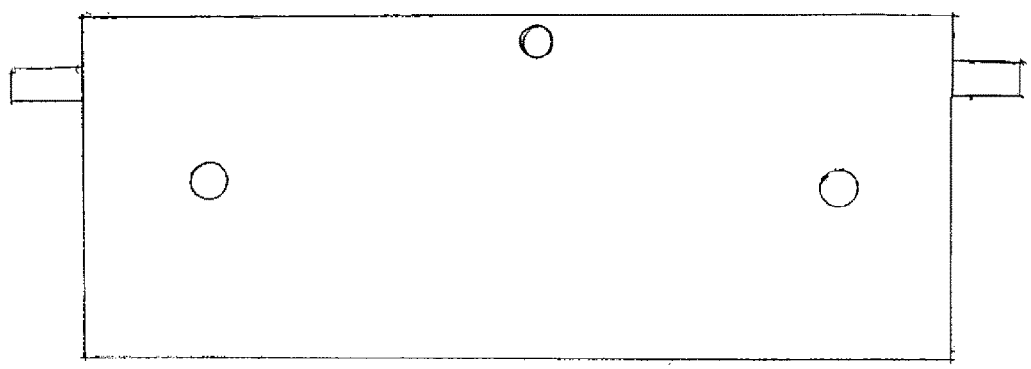
FIG. 4 is a schematic diagram showing the valve box.
Figure 5:
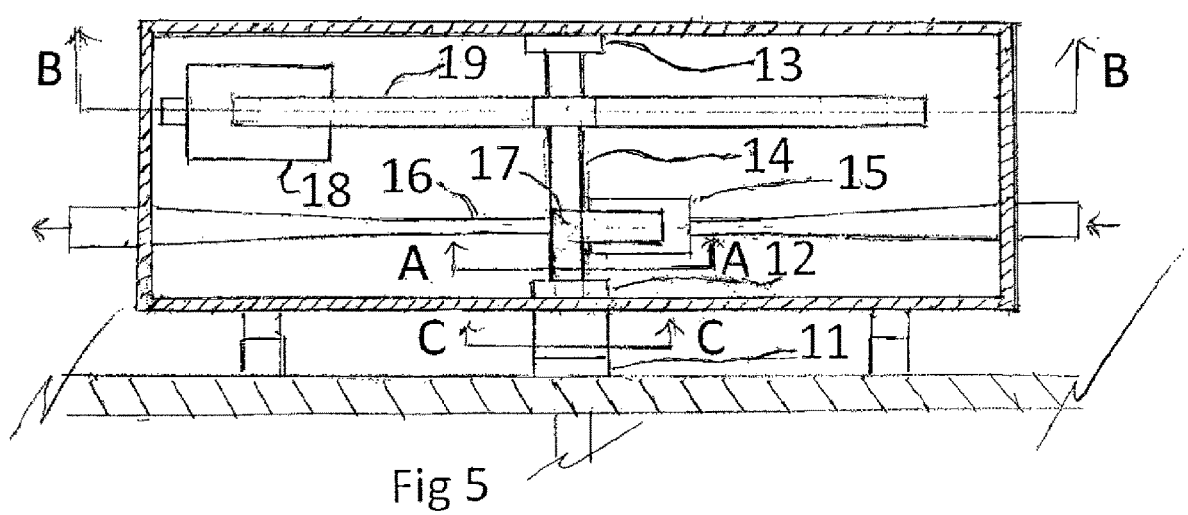
FIG. 5 is a schematic diagram of the valve box showing the incoming and outgoing water supply 16, gate valve block 15, rotating shaft 14, seesaw-like structure 19, lead weight assembly 18, ball bearing supporting the rotating shaft 13, float side shaft 11 and pivoting arm of the gate valve 17 (not shown).
Figure 9:
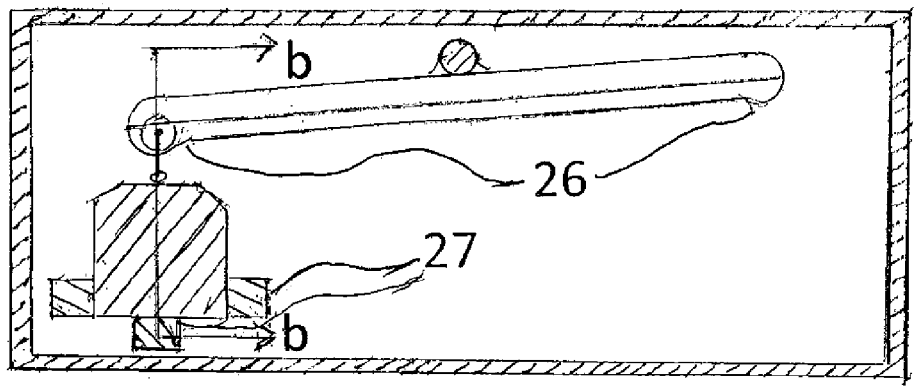
FIG. 9 is a schematic diagram of the valve box showing the seesaw like structure 26 (drop) and the lead weight assembly with cushioning attachments (27).
Figure 11:
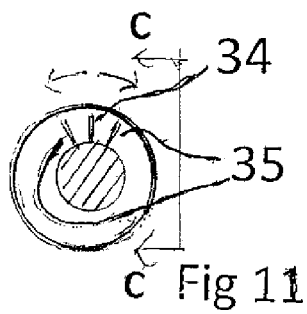
FIG. 11 is a schematic diagram showing the two protruding extensions on the shaft of valve box side 35, and the single extension of the shaft on the float side 34.

The valve box is installed on the outside of the AST and the Float inside the AST. (FIG. 3) is the plan view and (FIG. 4) is the elevation view of the valve box. The valve box is fixed to the AST at two points 3 with any conventional fixing methods. In between the two points is the connection from the float side to the valve box 6.

4) The valve box has two main components inside, the valve a) and the miniature seesaw-like structure b), sharing and rotate on a common shaft.

The valve consists of a small rectangular block 15 and a flat plunger like piece with the fulcrum 17 fixed to the shaft 14, and the shaft is supported by two ball bearings 12, 13. On either side of the block are the water incoming inlet and outgoing outlet. The two tubing are encased in the block and meet at the gap of the valve. When the shaft rotates, the plunger like piece will move up and down of the block, i.e. closing and opening of the valve.

The tubing is reduced in diameter 16 before it is connected to the block and out-going is also reduced similarly. The purpose is to reduce the pressure in the pipeline at the valve so that the chances of leakage are lower. There is also a provision for seepage or leakage at the valve so that when the valve is shutdown, the water seepage 21 will be released through it. (FIG. 7) and (FIG. 8) are the enlarged cross section of the plunger like piece 20 with (FIG. 7) showing the plunger like piece closed and (FIG. 8) showing the plunger like piece opened. The horizontal shaded area is the water proofing material 22 and the perimeter is also lined with water proofing material 23. The end of the arm is attached with a steel rod 24 for closing and opening of the valve. The steel rod and the arm are loosely linked with a support in rounded shape so that there will not be off centre force on the plunger like piece when closing and opening. The plunger like piece contains a block 25.

The seesaw like structure 18,19,26 is also fixed to the same shaft as that of the valve. It consists of a track with a ball bearing 29 travelling on it. Supported on the ball bearing is a piece of lead weight. The weight of the whole assembly will make the ball bearing travel from one side to the other side when the shaft rotates. There is a sudden drop 26 at the end of the track which will prevent the ball bearing from moving the minute the shaft rotates; it will start to move only when the rotation reach certain level when the bottom of the drop is higher than the fulcrum point.

Figure 10:
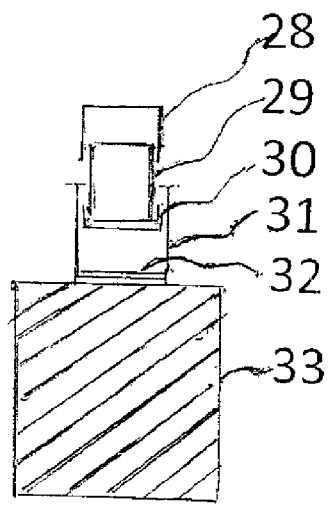
FIG. 10 is a schematic diagram of the lead assembly showing the top track 28, ball bearing 29, bottom track 30 supporting frame 31 and 32, and lead weight 33.

There is a piece of soft cushioning material 27 at either side of the lead and at the bottom to reduce the effect of impact sound when the lead hits the wall, and also to limit the movement of the seesaw like structure. (FIG. 10) shows the enlarged detail of the whole assembly; the top track 28 has a guardrail to prevent the ball bearing from falling out; the bottom track 30 has an upturn also help to guide the ball bearing to travel along the track; the ball bearing 29, the steel member 31 supporting the lead; the holder 32 on the lead weight for the steel member to hold the lead; and the lead weight 33.

The track is set at an angle parallel to the valve arm so that when the ball bearing assembly moves from one side to the other side, it will be the closing and opening of the valve at the same time. The exact size of the lead weight has to be calibrated so that it will provide sufficient force for moving up and down the valve; or the length of the track can be increased to achieve the required force.

Figure 12:
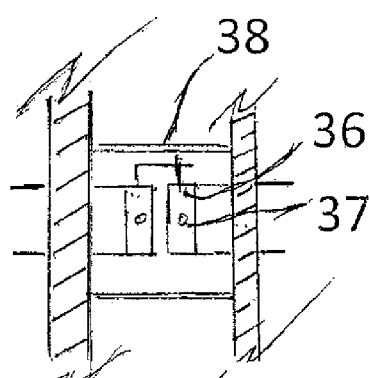
FIG. 12 is a schematic diagram showing cover 38 and fixing of extension 37.

The float side shaft and the valve box side shaft are not tightly linked (FIG. 12). The two shafts are not connected; it is separated by a small gap. Both the float side shaft and the valve box side shaft have a capping with a protruding extension 34, 35, 36, 37 which is fixed to the ends.

The protruding extension 34 on the float side is the guiding member that follow the rotational effect of the float which will move the two protruding extension 35 on the valve box side, clockwise or anti clockwise, which then will cause the ball bearing assembly to move from one side to the other side when the seesaw like structure rotates beyond the level where the bottom of the sudden drop 26 is higher than the fulcrum.

The float initiates the rotational force but does not control the closing and opening of the valve. The valve is controlled by the ball bearing assembly which opens and closes the valve when moving from one side to the other side. The movement of the protruding extension on the float side will be limited to within the ambit of the two protruding extensions on the valve box side. When the single protruding extension on the float side starts to rotate, clockwise or anti-clockwise, it will push one of the two protruding extensions on the valve box side, up to a point where the ball bearing assembly starts to move to the opposite and reverse the position of the valve; the single protruding extension then stops and wait for the float to initiate the opposite direction rotation; but because the angle at which the two protruding extensions are set at is wider than the ambit of movement of the single protruding piece, the opposite rotation, when the valve is reverse, will not trigger the lead assembly initially as the single protruding piece will not be in contact of the two protruding extensions, until later and It reaches the level where the bottom part of the drop is higher than the fulcrum. The ambit of movement of the single protruding piece is limit to the two initial movement of the lead assembly.

The AST functions automatically as described above once connected and water supply turned on.

This will enable the system to close and open the valve at short interval abruptly. The sensitivity of the valve can be adjusted by varying the depth of the sudden drop and at how wide an angle the two extension protruding pieces are set at. The deeper is the drop the less sensitive it will be; and vice versa. The wider the angle of the two protruding extensions is set at will also reduce the sensitivity of the valve.

This is important for maintaining the efficiency of the RO and also the quality of the water produced using the RO filter will be maintained. There is a transparent cover 38 to prevent dust from contaminating the parts.

5) The float valve does not control the water supply from the pipeline directly into the AST as in the case of most of the conventional valve. The supply is to the RO system which then also will fill up the AST but with filtered water, and at much slower pace.

6) There is only connection from the AST to the RO faucet outlet, and the inlet from the pipeline to the valve and from the valve to the RO system when the AST is installed above the faucet level.

Figure 13:
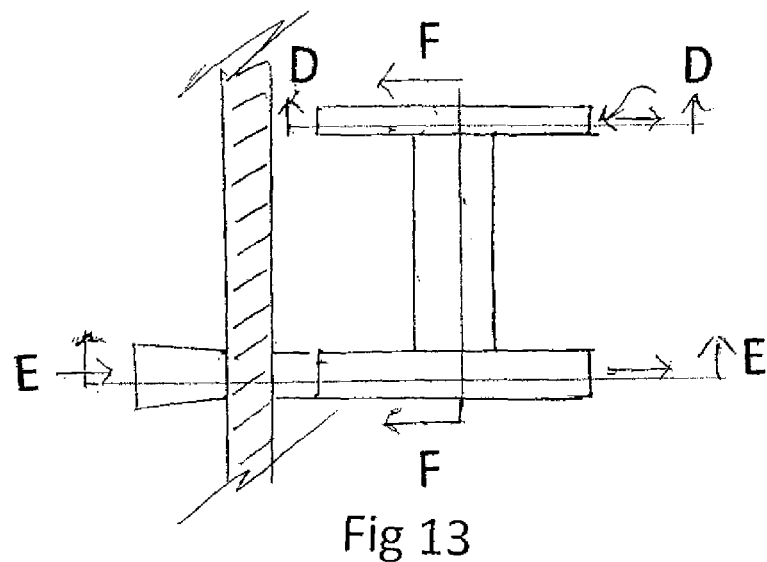
FIG. 13 is a schematic diagram showing the top view of a pumping gadget.

7) When the AST is installed below the RO faucet level, the pumping gadget will be required. The pumping gadget consists of two miniature flywheels (FIG. 13) and a special faucet. The flywheels are encased in cover and have small fins that are spaced at few mm intervals.

Figure 14:
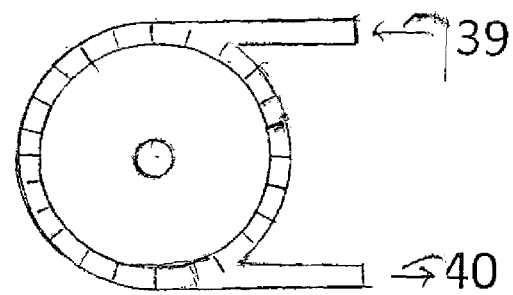
FIG. 14 is a schematic diagram of the pumping gadget showing the driving wheel pipeline water inlet 39 and outlet 40.
Figure 15:
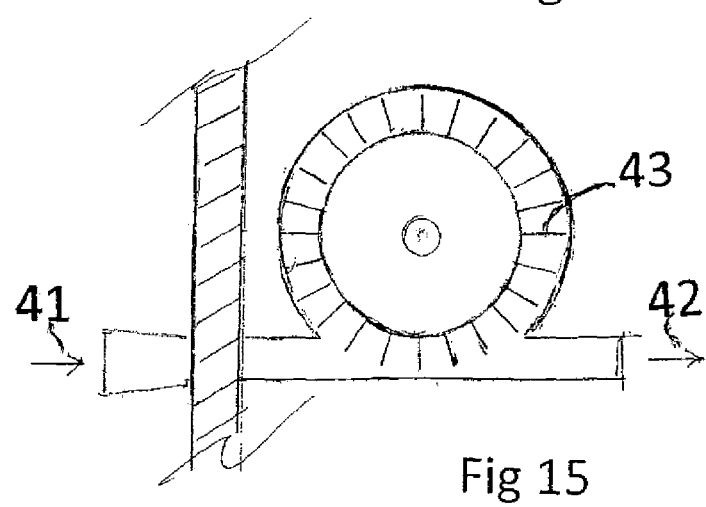
FIG. 15 is a schematic diagram of the pumping gadget showing the delivering wheel filtered water inlet 41, outlet 42, and fins size 43.
Figure 16:
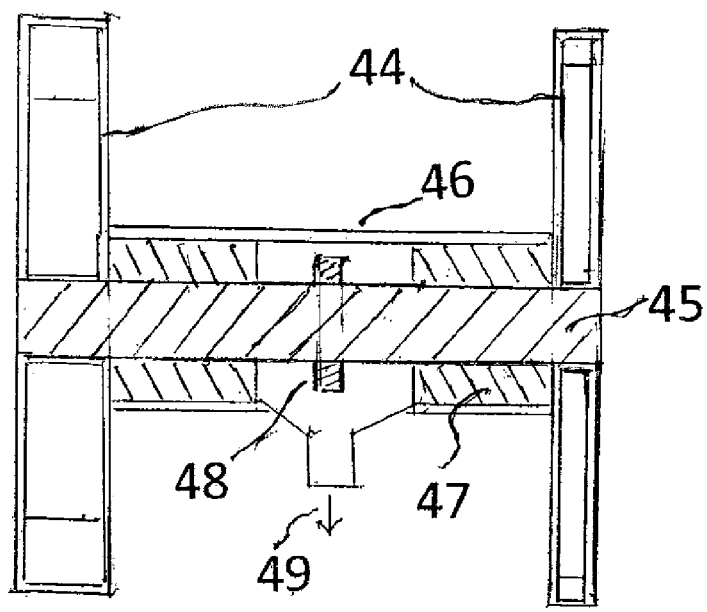
FIG. 16 is a schematic diagram of the pumping gadget showing cover 46, the driving and delivering wheels 44, shaft 45, roller material 47, separator piece 48, and discharge 49.
Figures 17, 18, 19:
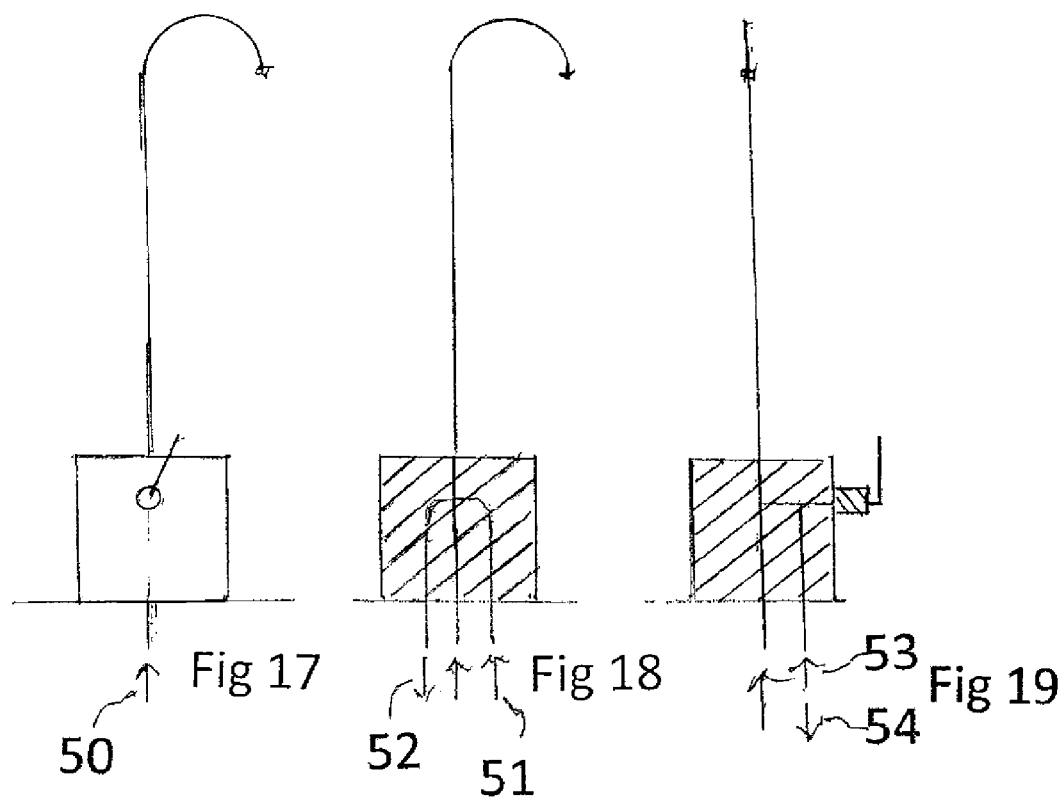
FIG. 17 is a schematic diagram of a normal faucet for RO with only a water inlet/outlet of filtered water.
FIG. 18 is a schematic diagram of a special faucet for RO filtered water with pipeline water inlet and outlet which controls the opening and closing of the driving wheel and delivering wheel concurrently.
FIG. 19 is a schematic diagram showing the filtered water inlet/outlet which is controlled by the opening and closing of the special faucet.

The two miniature flywheels consist of one driving side (FIG. 14) and one delivering side (FIG. 15). There is incoming water from the pipeline 39 and out-going water to the drainage or WT 40.

The driving side has a much smaller dimension than the delivering side, other than the diameter, which is the same. The reduction in dimension is to increase the flow energy. The increase is for pumping the filtered water up against gravity and at the same time to save pipeline water. There is also an ordinary flow restriction valve for adjusting the strength of the flow to the required level. The delivering side has an inlet 41 inside the AST, an outlet 42 outside the AST, and has the fins 43. There is a thin plate 44 that covers both sides of the flywheel. The flywheels are driven by a common shaft 45.

The common shaft is within a roller material 47 which will allow the shaft to rotate freely with very little resistance. There is also a cover 46 that prevents dust from entering. At the centre of the shaft, there is a barrier 48 to prevent the water from either side of it from crossing. Any seepage or leakage from the flywheels will go into the drainage or WT through the outlet 49.

The special faucet is a normal one when the AST is installed above it with only a provision for water inlet 50. It is special because it has water inlet/outlet of pipeline water in addition to the filtered water inlet/outlet, both controlled by the same opening and closing lever. When the lever is turned on, the pipeline water will flow through the inlet and outlet of the special faucet and to the driving wheel of the pumping gadget to drive the driving wheel which will drive the delivering wheel and deliver the filtered water back to the faucet where the inlet/outlet is already opened simultaneously by the opening lever. The pipeline water, from the outlet of the driving wheel will be discharged into drainage or WT (not included in the application). But externally, a normal RO faucet and a special RO faucet look the same. When the pumping gadget is required; the special faucet will have provision for inlet 51, 53 and outlet 52, 54 for pipeline water. 8) When the faucet is turned on, the pipeline water will flow through the special faucet from the inlet and out to the outlet of the special faucet and continue to flow to the inlet of the driving wheel and out to the drainage or the WT.

The invention claimed is:

1. An Atmospheric Storage Tank (AST) system configured to store filtered water from a Reverse Osmosis (RO) filter without utilizing a pressure tank for pumping the water and without an electrical device for controlling the supply of water to the RO filter via an inlet water pipeline comprising:

an atmospheric storage tank having (i) a tank inlet in communication with an outlet from the RO filter and (ii) a tank outlet in communication with an outlet of an RO faucet;

a float valve which includes a float and a valve box;

wherein the float is positioned in the AST and the valve box is positioned outside of the AST;

wherein the valve box is in fluid communication between the inlet water pipeline and the RO filter;

wherein the float valve is configured to open and close at a required interval to control the flow of water from the inlet water pipeline to the RO filter;

wherein when the AST is installed above a level of the RO faucet outlet, the filtered water can be collected from the RO faucet outlet through gravitational force;

wherein when the AST is installed below the level of the RO faucet outlet, the AST system further comprises a pumping gadget, and the RO faucet includes the inlet water pipeline and an outlet water pipeline to drive the pumping gadget to deliver the filtered water to the RO faucet for collection;

wherein the valve box further comprises a valve and a seesaw like structure with a ball bearing supporting a piece of lead weight;

wherein the seesaw like structure consists of a track with the ball bearing travelling on the track and the piece of lead weight is supported on the ball bearing;

wherein the valve and the seesaw like structure are parallel to each other and they are fixed on to a valve box side shaft and the shaft is supported by two ball bearings;

wherein the shaft follows a movement of a float side shaft and moves the piece of lead weight to and from both sides and at the same time opens and closes the valve simultaneously; and wherein the valve functions automatically once connected and water supply is turned on.

2. The AST system according to claim 1, wherein the float side shaft and the valve box side shaft are not in contact having a gap therebetween; wherein both the float side and the valve box side shafts have extension protrusions, with the float side shaft having a single extension protrusion and the valve box side shaft having two extension protrusions; wherein when the single extension protrusion starts to rotate clockwise and anticlockwise, one of the two extension protrusions will be pushed to one side until it reaches a level higher than a fulcrum of the shafts, and a ball bearing assembly starts to move to an opposite side where the valve reverses its position; when the rotation of the single extension protrusion starts to reverse, it will not move a lead assembly comprising the piece of lead weight initially as the two extension protrusions are set at an angle wider than the ambit of the movement of the single extension protrusion, and the single extension protrusion is not in contact with the two extension protrusions initially when reversed; wherein until it reaches a level that is higher than the fulcrum, the lead assembly starts to move back to the opposite side, enabling the valve to open and close abruptly which will ensure the efficiency of the RO filter and quality of the filtered water; the movement of the single extension protrusion on the float side shaft will be restricted to within the ambit of the two extension protrusions on the valve box side shaft setting the interval of the opening and closing of the valve at the points where the lead assembly starts to move; and wherein the interval can be adjusted by adjusting a depth of a sudden drop of the track.

3. The AST system according to claim 1, wherein the valve has tubing reduced in diameter for reduction in water pressure; the valve also has discharge for water seepage or leakage; and a steel rod is supported loosely on a rounded support for preventing any effect of off-center up and down force on a plunger piece, and the valve is covered with waterproofing material.

4. The AST system according to claim 1, wherein the seesaw like structure has a guardrail on a top track to prevent the ball bearing from falling out of the track and an up stand at a bottom track to help to guide the ball bearing assembly to travel on the track.

5. The AST system according to claim 1, wherein the lead weight has a piece of soft cushioning material at both ends and a bottom of the lead weight to reduce the effect of the impact sound and to restrict the limit of the movement of the seesaw like structure; the lead weight can be calibrated to the required weight for the required force on a plunger piece; a length of the track is selected to achieve the required force.

6. The AST system recited in claim 1 has no connection or flow of water going into drainage or a wastewater tank (WT) when it is installed above the faucet level; and does not require electricity or pump to function; the flow of water functions on gravitational force; when the supply is turned on, it goes to the RO filter which then will fill up the AST.

7. The AST system according to claim 1, wherein the pumping gadget is fixed to the AST at an inlet end to the AST on an inside with a delivering wheel on an outside; a driving side has an inlet from a water pipeline and an outlet to a drainage or a wastewater tank (WT); when a driving wheel rotates, it will simultaneously rotate the delivering wheel which pumps the filtered water to the faucet for collection; there is also a normal flow restrictor for adjusting the flow to a required strength.

8. The AST system according to claim 7 further comprises two flywheels, wherein the two flywheels have a piece of separator at the center of a shaft in the pumping gadget which will prevent any leakage or seepage of water from both sides from crossing; any leakage or seepage from the flywheels will discharge through the drainage or the WT outlet provided.

9. The AST system recited in claim 1 above will have capacity for storing the filtered water without reduction due to presence of a bladder bag in an ordinary pressure tank.

\* \* \* \* \*